Patented Sept. 25, 1945

2,385,410

UNITED STATES PATENT OFFICE 2,385,410

PRODUCTION OF ORGANIC DISULPHIDES

John Albert Gardner, Llangollen, Wales, assignor to Monsanto Chemicals Limited, London, England, a British company No Drawing. Application July 21, 1942, Serial No. 451,738. In Great Britain July 21, 1941

8 Claims. (Cl. 204—72)

This invention consists of improvements in or relating to the production of organic disulphides.

Certain organic disulphides such as those derived from aryl thiazoles or thiuram compounds are particularly suitable for use as rubber accelerators and one object of this invention is to provide a simple and economical method of producing such disulphides.

This invention includes a method of producing organic disulphides particularly those containing thiazole or thiuram groups, which consists in treating an aqueous solution of an alkali metal salt or alkaline earth metal salt of a mercapto thiazole or a dithiocarbamic acid by electrolysis with alternating current whereby the hydroxide of the alkali or alkaline earth metal is liberated and the disulphide is formed by the union of the residues from two molecules.

This invention also includes a method of producing dibenzthiazyl disulphide which consists in electrolysing an aqueous solution of the sodium salt of mercaptobenzthiazole

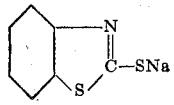

using alternating current so as to produce the double sulphide

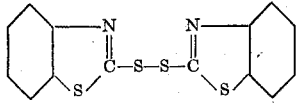

with the simultaneous formation of sodium hydroxide.

Dealing with the question of electrodes, it is found that non-metallic electrodes are the most useful, preferably carbon electrodes. In some instances platinum electrodes can be used. Where contamination of the product with any metal is unimportant certain metallic electrodes can be used, such as nickel-chromium-iron electrodes, but traces of metallic compounds are often disadvantageous in chemicals which are to be used for rubber vulcanisation. Therefore in the production of a disulphide from mercaptobenzthiazole for use as an accelerator in the vulcanisation of rubber, non-metallic electrodes are preferred.

Turning to the question of the solution subjected to electrolysis with alternating current, in certain circumstances it may be desirable to increase the conductivity of the solution being electrolysed by adding a salt such as sodium sulphate.

The efficiency of the process is dependent to some extent on the current density used. Thus for the efficient production of dibenzthiazyl disulphide, using graphite electrodes, it is found that the current density should be about 1 ampere per square centimetre. The efficiency falls as the current density is diminished, while at higher current densities there is a tendency for the electrodes to disintegrate.

The frequency of the alternating current employed may affect the result. The frequency normally employed for the process (for convenience) is 50 cycles, but it has been found that satisfactory results can be obtained with a higher or lower frequency, or with alternating current generated from a direct current which is frequently reversed, e. g., five times or more per second. The process has been found to take place with direct current, but deposition of the disulphide on the electrodes causes polarisation. Scraping devices on the electrodes will permit the utilisation of direct current, but the process herein disclosed is a simple and convenient method of overcoming the polarisation.

It is important to control the pH of the solution, and it has been found that for efficient working it is advisable to maintain the pH value at a figure corresponding to that given by a solution containing one equivalent of base to each equivalent of the acidic organic compound being oxidized, the concentration being that selected for optimum working. This is accomplished by combining the excess alkali formed during the passage of the alternating current with acid, and preferably, where possible, by the use of the said compound as the acid.

The nature of this invention and of subsidiary features thereof will be appreciated from the following description by way of example of certain embodiments.

*Example I*

A solution of 33 grams mercaptobenzthiazole, 20 ml. 30% wt./wt. caustic soda solution, 300 ml. water was warmed to 70° C. The pH of the solution was measured on an antimony and saturated KCl/calomel electrode set-up; the initial millivolt reading was 520. The solution was vigorously stirred throughout the experiment. Two electrodes of platinum rod, 0.2 cm. diameter, were placed in the solution about 1.5 cm. apart, about 4 cm. of each electrode being actually immersed. The electrodes were connected to a transformer served by 250 v. single phase alternating current 50 cycles. The current was taken from the 16 v. tapping on the output side of the transformer, and passed through the electrolyte. The current of 1.6 amps. was passed for 2 hours 52 minutes, the cell temperature being maintained, by external heating, at about 70° C. Mercaptobenzthiazole (dry powder) was fed into the solution whenever the millivolt reading rose above 600, 23 grams being used. The cell contents were then filtered, the disulphide washed, dried and weighed. The yield was 27 grams of slightly yellowish material of melting point 171.5° C. The filtrate and washings were mixed and acidified with mineral acid, 25 grams of mercaptobenzthiazole being recovered.

In the case of the dibenzthiazyl disulphide it is advantageous to work at temperatures up to 70° C. or even 100° C. and as stated in the example, it was found advantageous to add mercaptobenzthiazole to the solution during the electrolysis to counteract the formation of free caustic soda and an excess of the thiazole may be present practically throughout the electrolysis.

In an alternative procedure the electrolysis may be interrupted, the electrolyte filtered to remove the disulphide and the filtrate used to dissolve fresh mercaptobenzthiazole. One can employ pure mercaptobenzthiazole or the crude product obtained by autoclaving aniline, carbon disulphide and sulphur, the thiazole going into solution in the alkaline electrolyte and the pitchy impurities from the autoclave reaction remaining undissolved, or under certain conditions depositing on the electrodes, whereby they can be removed from the liquors under treatment. After removal of the impurities the electrolytic oxidation can proceed normally.

Since the solution to be electrolysed is alkaline, it is possible to substitute for the platinum electrodes other metal electrodes which are unaffected by the solution (such as stainless steel electrodes) or non-metallic electrodes such as graphite.

The following are further examples of the production of a disulphide from sodium mercaptobenzthiazole:

*Example II*

300 ml. of 12.1% sodium mercaptobenzthiazole solution and 30 gm. sodium sulphate were placed in a litre beaker fitted with a stirring mechanism, a thermometer, and a pH meter as described in the previous example. The electrolysis electrodes were of graphite, each of 1.2 square centimetre area and connected to the 9 v. tapping on a single phase transformer. The temperature was raised to 70° C. and electrolysis commenced with alternating current of 50 cycles per second. The millivolt reading was originally about 520, and whenever it rose above about 570, dry mercaptobenzthiazole powder was added. After 5 hours, when 4.8 gm. had been added, the solution was filtered. The dibenzthiazyl disulphide on the filter was lightly washed and the filtrate returned for re-oxidising. The disulphide was then further washed and dried. It weighed 6.9 gm. and had a melting point of 165.6° C. The power consumed was of the order of 0.045 kilowatt-hour.

The electrolysis was continued on the filtrate for a further 5½ hours, mercaptobenzthiazole being added, as before. When 19.4 gm. had been added, the mixture was filtered and well washed with hot water. The dried dibenzthiazyl disulphide weighed 19.8 gm. and had a melting point of 175.3° C. The meter showed that 0.04 kilowatt-hour had been used. From the filtrate, 31.5 gm. mercaptobenzthiazole were recovered on acidification. A further 1.3 gm. were recovered from the additional washings of the first batch of dibenzthiazyl disulphide.

*Example III*

300 ml. of a 29% solution of the sodium salt of mercaptobenzthiazole were placed in a 2 litre beaker and diluted with 600 ml. of water. A stirrer to give rapid agitation, electrodes, thermometer and pH electrodes were fitted into the beaker. The electrolysis electrodes were of graphite, and had an exposed surface of 5 sq. cms. each, being 0.5 cms. apart.

The solution was heated to 75° C. and electrolysis started, the voltage being 12 and the frequency 50 cycles. The initial millivolt readings on the potentiometer were 540. Whenever the readings rose above about 560, dry mercaptobenzthiazole was added to bring the readings down to about 520. The electrolysis was continued for 3 hours 20 minutes, when the dibenzthiazyl disulphide was filtered off, washed and dried. The average current was 3.7 amperes, although it was very variable. 15.0 gms. of mercaptobenzthiazole had been added during the electrolysis, and the yield of dibenzthiazyl disulphide was 17.0 gms., corresponding to a current efficiency of 23%. By acidification of the filtrate 80.0 gms. of mercaptobenzthiazole were recovered.

*Example IV*

300 ml. of a 29% solution of the sodium salt of mercaptobenzthiazole were diluted with 600 ml. of water and 90 gms. of sodium sulphate added. The solution was electrolysed at 75° C. with graphite electrodes of 8 sq. cms. area each, and 0.5 cm. apart. The pH was measured as in the previous example, dry mercaptobenzthiazole being added whenever the millivolt readings were above 570. The voltage of electrolysis was 8 volts and the average current 5.7 amperes. After 3 hours, when 13.5 gms. mercaptobenzthiazole had been added, the dibenzthiazyl disulphide was filtered off. After drying, it weighed 14.2 gms. and had a melting point of 163° C.

The filtrate was replaced in the beaker and electrolysis continued for a further three hours with an average current of 5.7 amperes. 33.5 gms. of mercaptobenzthiazole had been added when the electrolysis was stopped, and the dibenzthiazyl disulphide filtered off and dried. It weighed 35.0 gms. and had a melting point of 169.5° C. The filtrate was again replaced in the beaker and electrolysis continued for a further 6 hours 15 minutes at an average current of 5.5 amperes. 38.5 gms. of mercaptobenzthiazyl had been added when the dibenzthiazyl disulphide was filtered off and dried. It weighed 40.0 gms. and had a melting point of 170.0° C. By acidification of the filtrate 73.0 gms. of mercaptobenzthiazole were recovered.

Although the examples illustrate the removal of the disulphide intermittently, it will be understood that the process can be adapted for continuous working.

This disulphide is one of the most important rubber accelerators, and the method described for its production has proved very effective. The same method, namely the treatment by electrolysis (with alternating current) of an aqueous solution of an alkali metal salt or alkaline earth metal salt may be applied to other aryl thiazole salts or to similar salts of other organic compounds containing the

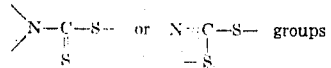

In another example of the application of this invention, an aqueous solution of sodium dimethyl dithiocarbamate

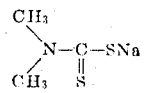

is subjected to electrolysis with alternating current with the object of producing the known rubber accelerator tetramethylthiuram disulphide

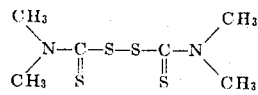

In this example it is found that platinum electrodes give the best results.

*Example V*

200 ml. of a 22% wt./vol. solution of the sodium salt of dimethyldithiocarbamic acid were placed in a 600 ml. beaker fitted with a stirrer and the platinum electrodes described in Example I. No pH control was used, owing to the greater stability of the disulphide to free alkali. The voltage was 16 volts and the electrolysis was carried out at 50-60° C. for 4½ hours. 0.15 kilowatt-hour was consumed. The tetramethylthiuram disulphide was filtered off, washed and dried. It consisted of 7.3 gms. of a light yellowish solid of melting point 136.5° C. This melting point was unchanged on admixture with an authentic specimen of tetramethylthiuram disulphide.

Although as stated above the use of carbon electrodes is preferred, there are certain types of graphite which are not really suitable for use in carrying out this invention and a simple preliminary trial is sufficient to enable the operator to select the best form of carbon electrode.

I claim:

1. A method of producing dibenzthiazyl disulphide which consists in elctrolysing an aqueous solution of a sodium salt of mercaptobenzthiazole

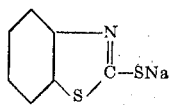

using alternating current alone and producing thereby the double sulphide

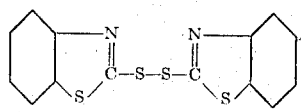

with the simultaneous formation of sodium hydroxide.

2. A method of producing organic disulphides which consists in treating an aqueous solution of a salt selected from the group consisting of an alkali salt of a mercaptothiazole and an alkaline earth metal salt of a mercaptothiazole by passing an electric current through the said solution, the said electric current consisting only of alternating current and the electrodes employed being carbon electrodes.

3. A method of producing organic disulphides which consists in treating an aqueous solution of a salt selected from the group consisting of an alkali salt of a mercaptothiazole by passing an electric current through the said solution, the said electric current consisting only of alternating current, the conductivity of the solution being increased by the addition of sodium sulphate in an amount substantially equivalent to 10 grams for every 100 milliliters of the solution.

4. A method of producing an organic thiazyl disulphide which consists in treating an aqueous solution of a salt selected from the group consisting of an alkali salt of a mercaptothiazole and an alkaline earth metal salt of a mercaptothiazole by passing an electric current through the said solution, the said electric current consisting only of alternating current.

5. A method of producing an organic thiazyl disulphide which consists in treating an aqueous solution of a salt selected from the group consisting of an alkali salt of a mercaptothiazole and an alkaline earth metal salt of a mercaptothiazole by the passage of alternating current alone, the pH of the solution being maintained at a figure corresponding to that of an aqueous solution of the salt being treated.

6. A method of producing dibenzthiazyl disulphide which consists in treating an aqueous solution of the sodium salt of mercaptobenzthiazole by passing an alternating current alone through the solution, the pH of the solution being maintained at a figure corresponding to that of a solution containing chemically equivalent proportions of mercaptobenzthiazole and sodium hydroxide.

7. A method of producing dibenzthiazyl disulphide which consists in treating an aqueous solution of the sodium salt of mercaptobenzthiazole by passing an alternating current alone through the solution, the pH of the solution being mantained at a figure corresponding to that of a solution containing chemically equivalent proportions of mercaptobenzthiazole and sodium hydroxide by the addition of mercaptobenzthiazole whenever the pH rises above the said figure.

8. A method of producing dibenzthiazyl disulphide which consists in treating an aqueous solution of a salt selected from the group consisting of an alkali salt of mercaptobenzthiazole and an alkaline earth metal salt of mercaptobenzthiazole by passing an alternating current alone through the solution, mercaptobenzthiazole being added whenever the voltage shown by an antimony-saturated KCl-calomel electrode system rises above 600 millivolts.

JOHN ALBERT GARDNER.